United States Patent
Hashimoto

[11] 3,889,282
[45] June 10, 1975

[54] ZOOM LENS STRUCTURE

[75] Inventor: Shigeru Hashimoto, Yokohama, Japan

[73] Assignee: Canon Kabushiki Kaisha, Tokyo, Japan

[22] Filed: June 14, 1973

[21] Appl. No.: 369,832

[30] Foreign Application Priority Data
June 26, 1972 Japan............................. 47-63810
June 26, 1972 Japan............................. 47-75229
June 26, 1972 Japan............................. 47-75230

[52] U.S. Cl.............................. 354/196; 354/46
[51] Int. Cl.................................... G03b 7/20
[58] Field of Search ...... 95/64 A, 44 R, 45; 353/95; 350/187, 206; 352/140, 141; 354/196, 46

[56] References Cited
UNITED STATES PATENTS

| | | | |
|---|---|---|---|
| 1,950,166 | 3/1934 | Durholy | 95/45 |
| 3,106,883 | 10/1963 | Erbe | 95/64 A |
| 3,221,628 | 12/1965 | Mahn | 95/45 |
| 3,351,411 | 11/1967 | Chapman | 95/45 |
| 3,370,907 | 2/1968 | Cox et al. | 352/140 |
| 3,541,941 | 11/1970 | Barr et al. | 95/45 |
| 3,590,713 | 7/1971 | Kirstein | 95/45 |
| 3,591,256 | 7/1971 | Hoyer et al. | 350/206 X |
| 3,683,765 | 8/1972 | Iura | 95/10 C |
| 3,714,878 | 2/1973 | Hasegawa et al. | 354/46 |

*Primary Examiner*—Joseph F. Peters, Jr.
*Assistant Examiner*—E. M. O'Connor
*Attorney, Agent, or Firm*—William R. Woodward

[57] ABSTRACT

An interchangeable zoom lens has front and rear axially movable optical systems arranged to be moved in opposite directions to vary the focal length (zooming) and the front system is independently movable for focusing, by means of a distance ring projecting forward to provide a lens hood effect. The zooming control superimposes a displacement on the preset adjustment of the aperture by the aperture preset ring and also modifies the maximum open position of the aperture adjustment mechanism. In one embodiment, it also furnishes a correcting signal to the meter needle or matching pointer of the camera's photometry system.

8 Claims, 6 Drawing Figures

ZOOM LENS STRUCTURE

BACKGROUND OF THE INVENTION

1. Field of the Invention

This invention relates to a zoom lens used as an exchangeable lens for a single lens reflex camera having an exposure meter of the TTL open metering type, and more particularly to a zoom lens comprising only a first and a second movable optical system contributing to the provision of a variable focal distance.

2. Description of the Prior Art

Generally in a zoom lens, two respectively forward and rearward movable lens groups are disposed between the foremost focusing lens and the rearmost fixed lens group and axial movement of these movable lens groups results in adjustment of the focal distance, i.e. zooming.

Also, in the above-described construction of the zoom lens, if the aperture is designed for movement with one of the lens systems, the maximum relative aperture of the lens will be varied with any variation in the focal length which occurs with zooming, so that F-number will be reduced at the shorter focal length side thus introducing an abereation that needs correction. Such difficulty will be experienced especially when the lens is designed with a reduced full length. In such cases, it is necessary to vary the aperture diameter to limit it to a suitable value.

SUMMARY OF THE INVENTION

It is therefore an object of the present invention to provide a zoom lens structure which permits the described two movable lens groups to be moved in an associated manner by zooming means to adjust the focal length and also permits focusing to be accomplished by moving only one of the two lens groups independently of the other.

It is another object of the present invention to provide a zoom lens in which aperture control means is provided for controlling the maximum relative aperture in accordance with zooming operation and such control means also serves as a means for correcting an exposure meter in a camera.

It is still another object of the present invention to provide a zoom lens of the type described above in which a member surrounding the first and second optical system has a forward end portion providing a variable hood effect.

The invention will become more fully apparent from the following detailed description of preferred embodiments thereof taken in conjunction with the accompanying drawings.

DESCRIPTION OF THE PREFERRED EMBODIMENTS

Figure 1:
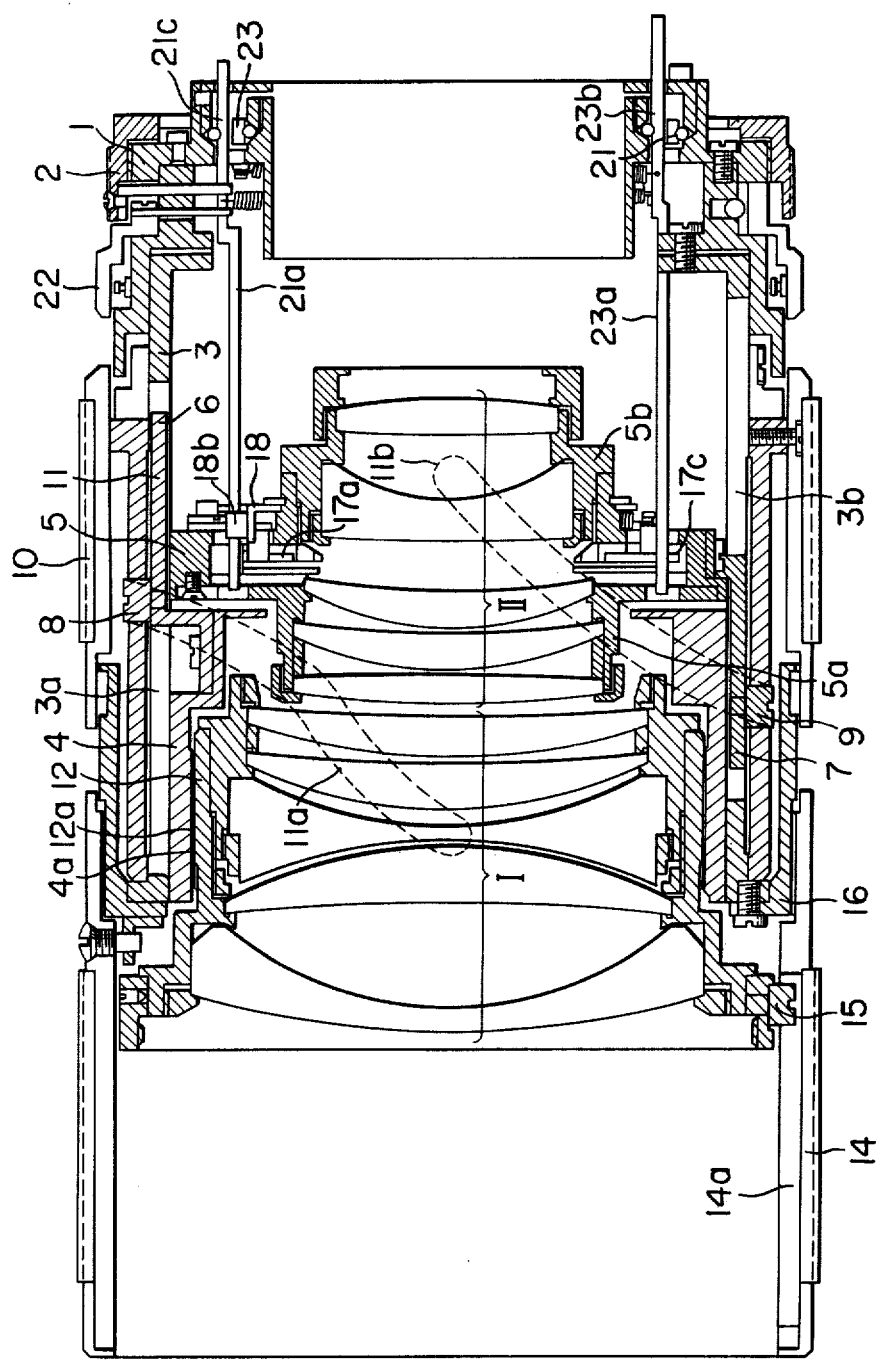
FIG. 1 is a longitudinal sectional view of the essential portions of the zoom lens structure according to an embodiment of the present invention.
Figure 2:
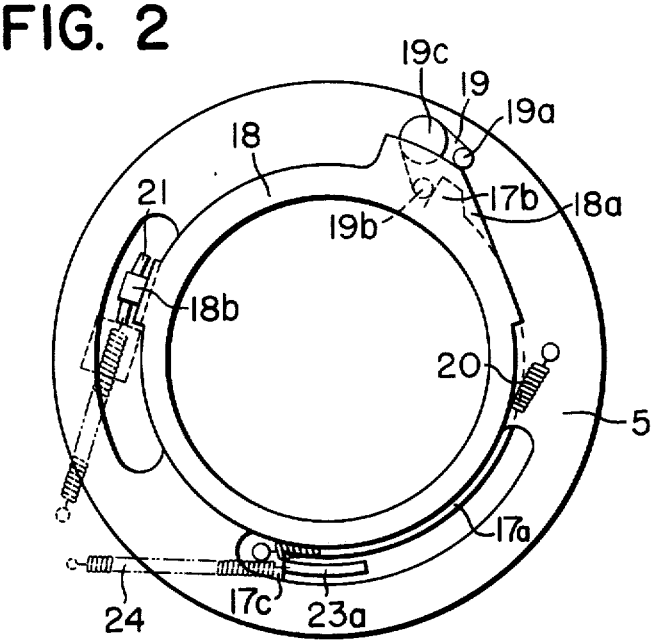
FIG. 2 is a cross-sectional view taken along line A–A' of FIG. 1.

Referring to FIGS. 1 and 2, the zoom lens structure according to an embodiment of the present invention includes a lens barrel fixing portion 1, a fastening ring 2 for fixing a lens barrel to a camera body, and a slide guide cylinder 3 integrally connected to the fixing portion 1. Within the slide guide cylinder 3 are slidably fitted movable cylinders 4 and 5 for holding a first lens group I of negative focal length and a second lens group II of positive focal length, respectively. As is well-known, the guide cylinder 3 has rectilinear guide grooves 3a and 3b which receive keys 6 and 7 provided on the respective movable cylinders 4 and 5. Pins 8 and 9 are secured to the keys 6 and 7, received in camming grooves 11a and 11b which are formed in a cam cylinder 11 integral with a zooming ring 10. Thus, rotation of the zooming ring 10 may cause the movable cylinders 4 and 5 to slide axially within the guide cylinder 3 to thereby adjust the focal length.

The first lens group 1 is held by a holder frame 12. The holder frame 12 threadably mates with the movable cylinder 4 by means of helical thread 12a formed peripherally of the holder frame, and has a pin 15 securely provided at the forward end thereof and received in a rectilinear groove 14a formed in a distance ring 14. Thus, upon rotation of the distance ring 14, the holder frame may be rotated and axially moved within the movable cylinder 4 with the aid of helicoid threads 4a and 12a.

The distance ring 14 threadably mates with a cylindrical member 16 secured to the slide guide cylinder 3 and is rotatably held, and the forward end of the distance ring is projected forwardly of the first optical system I so as to provide a hood effect for the lens.

The second lens group II is shared and held by frames 5a and 5b with an aperture unit 17 interposed therebetween, and axially slidable within the slide guide cylinder 3 in unison with aperture unit 17 and preset cam 18. The aperture unit 17 is of a known construction in which an aperture blade is held between a holder ring 17d secured to the frame 5b and an operating ring 17a rotatable with respect to the holder ring 17d, and a bell crank lever 19 is pivotally mounted on the frame 5b by means of a pivot 19c, the bell crank lever 19 having pin 19a engageable with the camming portion 18a of the present cam ring 18 rotatably held by the frame 5b and a pin 19b adapted to act as a stop for a projection 17b formed in the operating ring 17a, which is biased in the stop-down direction by a light spring 20 (see FIG. 2).

Figure 3:
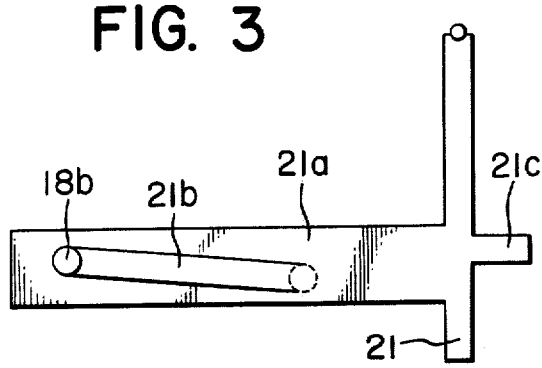
FIG. 3 is a developed view taken along line B–B' of FIG. 2.

A preset ring 21 is integrally connected to an aperture set ring 22 and journalled for rotation about the optical axis within the lens barrel. The preset ring 21 has a forwardly extending arm 21a provided with a camming groove 21b as shown in FIG. 3, and this camming groove receives therein a pin 18b studded in the arm 18a of the preset cam ring 18. The preset ring 21 also has a rearwardly extending arm 21c which is engaged with an exposure meter (not shown) provided in the camera.

The aperture set ring 22 has a click stop mechanism between itself and the lens barrel fixing portion and maintain itself stationary in its set position aginst the force of the spring 20.

An interlocking ring 23 for interlocking the aperture operating ring 17a with an aperture driving lever (not shown) in the camera is journalled for rotation about the optical axis, and has a forwardly extending arm 23a engaged with the projection 17c of the aperture operating ring 17a. The interlocking ring 23 is normally biased by a strong spring 24 to hold the operating ring 17a in fully open aperture position against the force of the spring 20. The ring 23 also has a rearwardly extending arm 23b engageable with an aperture driving lever (not shown) in the camera.

Figure 4:
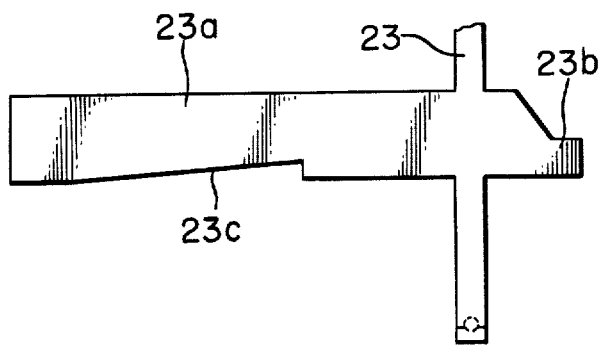
FIG. 4 is a developed view taken along lone C–C' of FIG. 2.

A camming surface 23c, as shown in FIG. 4, is formed in the side edge of the arm 23a which is engaged with the aperture operating ring 17a.

Figure 5:
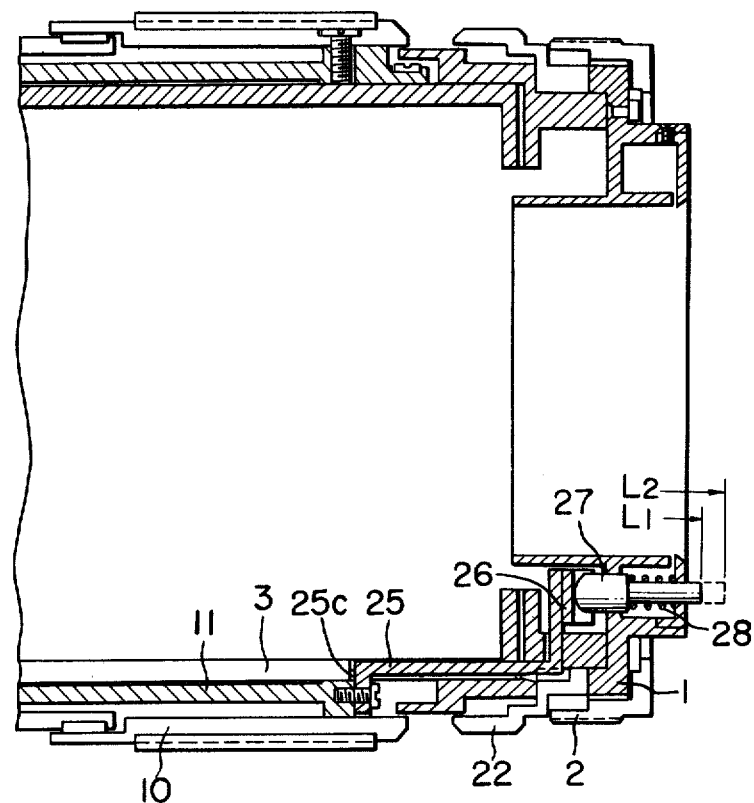
FIG. 5 is a fragmentary sectional view of another embodiment in which a photometry correction means is added to the arrangement of FIG. 1.
Figure 6:
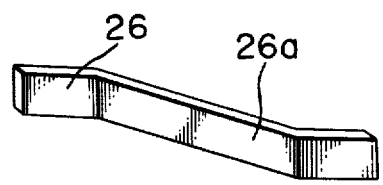
FIG. 6 is a perspective view of a cam plate employed in the embodiment of FIG. 5.

Referring to FIG. 5, which shows an additional feature that may be added, thus producing a modified embodiment of the invention a cam plate 26 is attached to the cam cylinder 11 by means of a connector rod 25 and rotatable with the zooming ring 10. A correction pin 27 is journalled to the rear end of the lens barrel for sliding movement along the optical axis, and it is biased by a spring 28 so that the forward end thereof is normally in engagement with the camming surface 26a of the cam plate 26 while the rear end is projected beyond the rear end of the lens barrel and into engagement with an exposure meter (not shown) in the camera.

With the above-described construction of the zoom lens structure, rotation of the zooming ring 10 causes rotation of the cam cylinder 11 therewith so that the movable cylinders 4 and 5 are moved rectilinearly within the slide guide cylinder 3 by means of the camming grooves IIa, IIb and pins 8, 9, thus adjusting the focal length. During that time, the aperture unit 17 is moved with the lens holder frame 5b and the projection 17c of the aperture operating ring 17a is rotated along the camming surface 23c of the arm 23b of the interlocking ring 23, whereby the aperture blade is actuated to control the open aperture diameter in accordance with the zooming so as to vary the quantity of light impinging on an unshown light-receiving element and thus vary the displacement of the needle of the exposure meter. At the same time, the preset cam ring 18 is also moved with the lens frame 5b so that the pin 18b on the arm 18a thereof is rotated along the camming groove 21b in the preset ring 21a, whereby the bell crank lever 19 is pivoted by the pin 19a engaged with the camming surface 18a of the cam ring, thus correcting the position of the stop 19b relative to the aperture operating ring 17a in accordance with the aforesaid variation in the open aperture diameter.

When the aperture set ring 22 is then rotated, the preset ring 21 is rotated therewith so that the arm 21c thereof transmits such rotation to the exposure meter and at the same time causes the cam ring 18 to be rotated by means of the camming groove 21b and pin 18b, thus presetting a proper aperture value corresponding to the indication provided by the exposure meter. Subsequently, in response to a shutter release operation of the camera, the aperture driving lever (not shown) forces the arm 23b of the interlocking ring 23 to be moved to a predetermined extent against the spring force, whereby the aperture operating ring 17a is pulled in the stop-down direction by the spring 20 until the projection 17b strikes against the pin 19b, whereupon the aperture diameter is determined.

Where the correction pin 27 is provided as shown in FIG. 5, rotation of the zooming ring 10 results in the above-described control of the open aperture diameter and the correction of the preset position in accordance therewith and also causes the cam plate 26 to be rotated to move the correction pin 27 engaged therewith along the optical axis.

Since the camming surface 26a is designed such that the extent of projection of the correction pin 27 is varied in accordance with the error in the quantity of light received by the light-receiving element which corresponds to the open aperture diameter, the indicator needle or follower needle of the exposure meter is displaced in accordance with the extent of projection $L_1$, $L_2$, . . . of the pin 27, and when the aperture set ring is operated, there is preset a proper aperture value for which the error in the quantity of light received has been corrected.

In the illustrated embodiments, the arm 21c of the preset ring interlocked with the exposure meter is designed so as to remain stationary during zooming, whereas depending on the construction of the exposure meter, the arm may be provided on the cam ring 18 so as to transmit the variation in the aperture diameter to the exposure meter during zooming. Further, the correction pin 27 may be used as a signal pin for open aperture ratio, and also utilized for the correction of the indicator scale of the exposure meter.

Thus, according to the present invention the zooming optical system comprising only a first and second optical systems contributing to the provision of a variable focal length is designed such that change of magnification is provided by a commom operating means while means is provided for additionally moving only one of the two optical systems to thereby accomplish the focusing, and this leads to the provision of a simply constructed, excellently operable zoom lens.

I claim:
1. A zoom lens structure comprising:
   first and second optical systems;
   a first lens carrier for holding said first optical system;
   a second lens carrier for holding said second optical system, said second carrier including adjustable aperture means including an aperture setting ring and aperture preset means operable by said aperture setting ring;
   zoom operation means for moving said two optical systems relatively to each other to effect varifocal action;
   focusing means for moving one of said first and second optical systems independently of the other;
   aperture driving means for stopping down the adjustable aperture from a maximum open value to a preset value, set by said preset means through said aperture setting ring, and
   correcting means operable by said zoom operation means for superimposing a corrective displacement upon the adjustment of said aperture preset means effected by the position of said aperture setting ring.

2. A zoom lens structure according to claim 1, wherein said aperture preset means includes a signal member providing the aperture value for an exposure meter in a camera.

3. A zoom lens structure according to claim 2, wherein said correcting means includes a second member providing the maximum open aperture value for the exposure meter.

4. A zoom lens structure according to claim 1, comprising also a member surrounding said first and second optical systems so disposed as to provide a lens hood effect.

5. A zoom lens structure according to claim 1, wherein said focusing means comprises a distance setting ring so disposed as to provide a lens hood effect.

6. A zoom lens structure according to claim 1, wherein said correcting means includes means for modifying said maximum open value of said adjustable aperture means.

7. A zoom lens structure as defined in claim 6, in which said correcting means includes also signal means for a camera body in which said zoom lens structure may be mounted.

8. A zoom lens structure according to claim 1, wherein said focusing means comprises means for moving said first optical system independently of said second optical system.

* * * * *